(No Model.) 3 Sheets—Sheet 1.

T. B. ATTERBURY.
TOOL FOR THE MANUFACTURE OF GLASSWARE.

No. 498,835. Patented June 6, 1893.

WITNESSES:
Dannie S. Wolcott
F. E. Gaither.

INVENTOR,
Thomas B. Atterbury
by George H. Christy
Att'y.

(No Model.) 3 Sheets—Sheet 2.

T. B. ATTERBURY.
TOOL FOR THE MANUFACTURE OF GLASSWARE.

No. 498,835. Patented June 6, 1893.

WITNESSES:
Danwin S. Wolcott
F. E. Gaither.

INVENTOR,
Thomas B. Atterbury
by George H. Christy
Att'y.

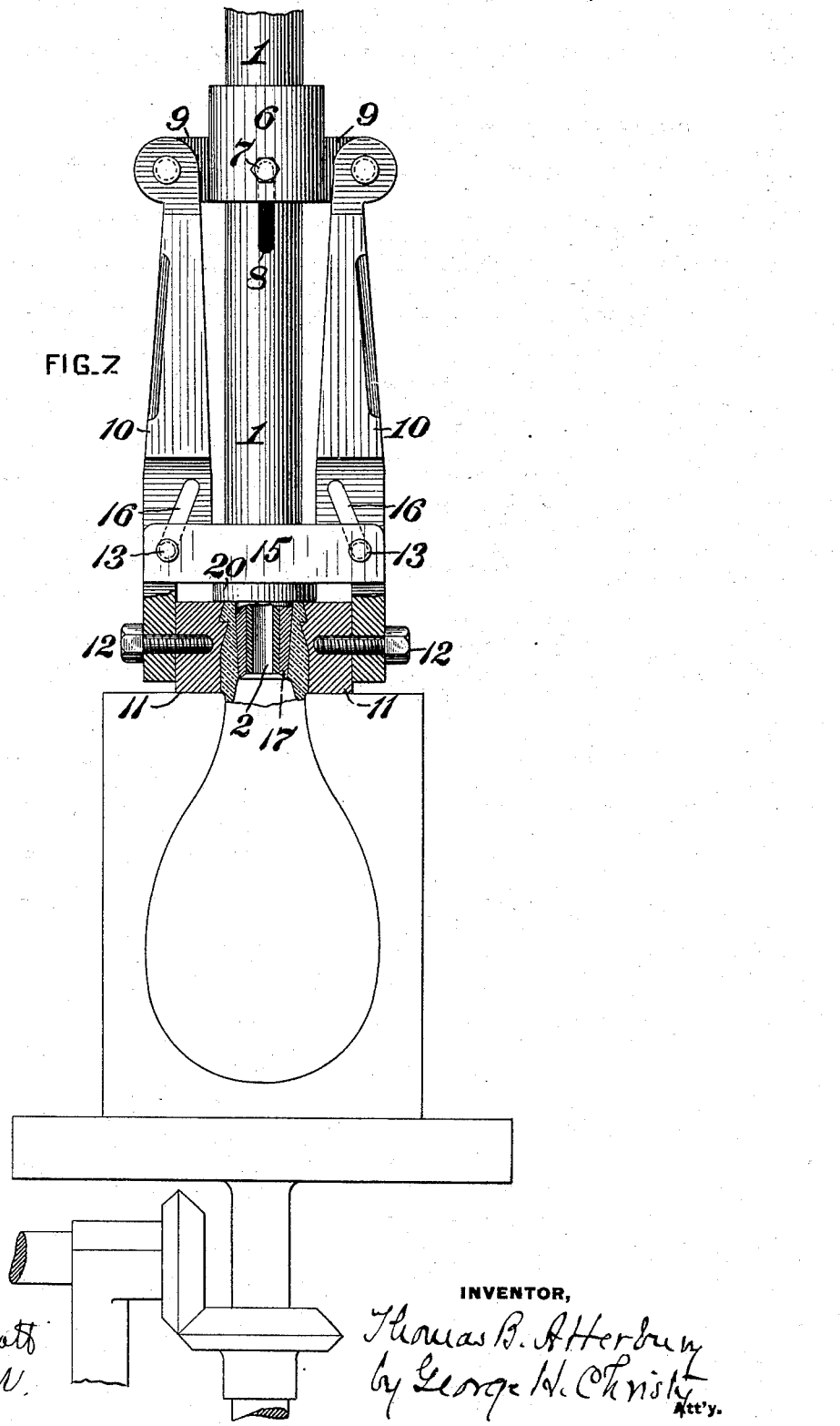

UNITED STATES PATENT OFFICE.

THOMAS B. ATTERBURY, OF PITTSBURG, PENNSYLVANIA.

TOOL FOR THE MANUFACTURE OF GLASSWARE.

SPECIFICATION forming part of Letters Patent No. 498,835, dated June 6, 1893.

Application filed October 1, 1892. Serial No. 447,490. (No model.)

*To all whom it may concern:*

Be it known that I, THOMAS B. ATTERBURY, a citizen of the United States, residing at Pittsburg, in the county of Allegheny and State of Pennsylvania, have invented or discovered a certain new and useful Improvement in Tools for the Manufacture of Glassware, of which improvement the following is a specification.

In an application of even date herewith, I have described and claimed certain improvements in the manufacture of hollow glassware, such as electric lamp bulbs, bottles, jars, &c. These improvements consist, generally stated, in pressing the neck portion of the article to a predetermined shape and size, both internally and externally, and then blowing the body portion to the desired shape, while preserving the previously imparted dimensions and shape of the neck portion.

The object of the present invention is to provide a combined snap and blow pipe so constructed that the neck portion of the previously shaped blank may be securely grasped in such manner as to prevent any distortion thereof during the blowing of the body portion of the article.

In general terms the invention consists in the construction and combination substantially as hereinafter more fully described and claimed.

Figure 1:
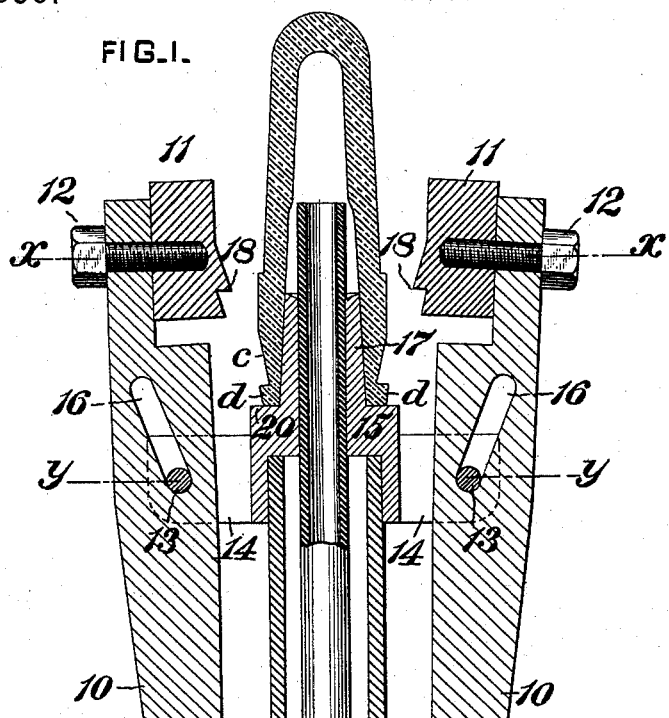
Figure 3:
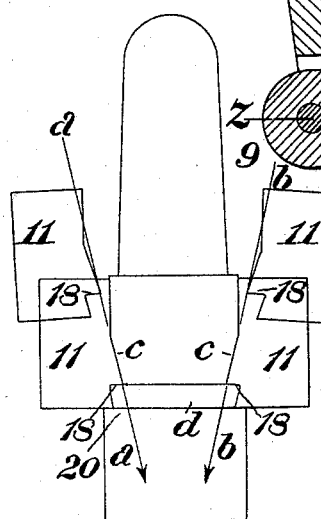
Figure 2:
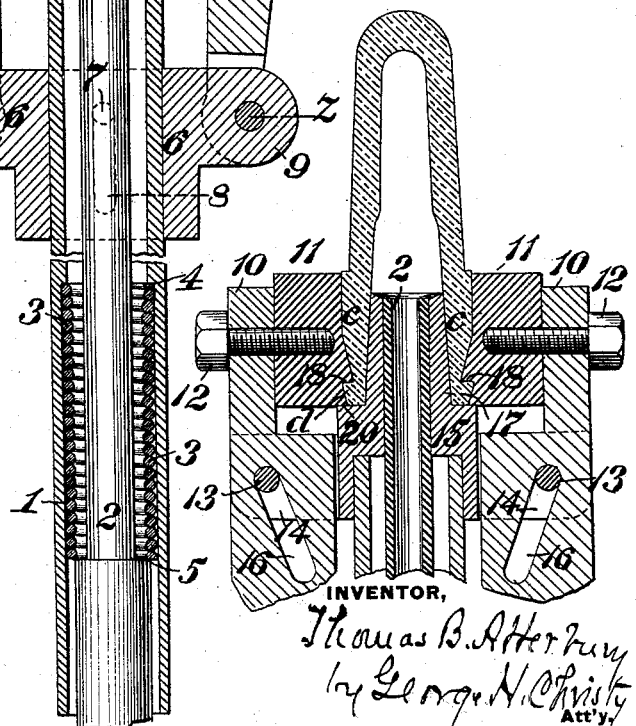
Figure 4:
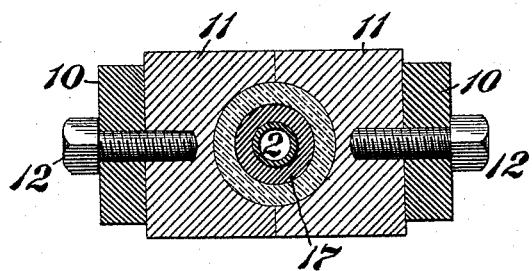
Figure 5:
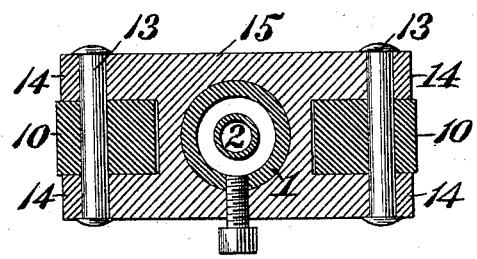
Figure 6:
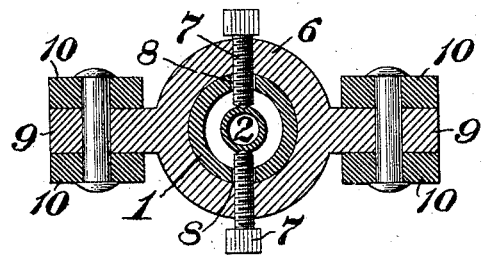

In the accompanying drawings forming a part of this specification, Figure 1 is a sectional elevation of my improved snap, the jaws being opened for the reception of the blank, which is shown in position on the supporting plug. Fig. 2 is a similar view of the head of the snap, the jaws being closed upon the blank. Fig. 3 is a diagrammatic view showing the lines of movement of the jaws in closing on the neck of the blank. Figs. 4, 5 and 6 are transverse sections, the planes of section being indicated by the lines *x, x, y, y,* and *z, z,* respectively, of Fig. 1; and Fig. 7 is a sectional elevation of my improved tool and a mold for shaping the body portion of a lamp bulb.

My improved tool consists of a tube 1 of suitable size and length and a blow-pipe 2 arranged within the tube and a little longer than the latter. A spring 3 is arranged around the pipe and bears at its ends against shoulders 4 and 5, on the pipe and tube, respectively, thereby tending to shift the pipe and tube in opposite directions. A cross-head 6 is attached to the blow-pipe so as to move therewith by screws 7, passing through longitudinal slots 8 in the tube and bearing at their ends upon the pipe, thus permitting of the movement of the tube through the cross-head. The latter is provided with lateral wings 9, to which are pivoted the arms 10 provided with clamping blocks 11 at their upper ends. These blocks 11 are by preference detachably secured to the arms 10 by screws 12 or other suitable means, in order that the same tool may be employed in the manufacture of articles having differently shaped neck portions. The arms with their clamping blocks or jaws are moved in or out as the pipe is moved up or down in the tube by means of pins 13 in the lugs 14 projecting from the head 15 on the upper end of the tube 1, engaging inclined slots 16 in the arms. As the blow-pipe is forced along the tube by the expansion of the spring 3, the cross-head 6 and its arms 10 are moved along the tube, while the head 15 remains stationary, thereby causing the pins to traverse the inclined slots and pull the arms inwardly toward the hollow plug 17 on the head 15.

The blank A is pressed to the desired shape in a suitable mold as described in application Serial No. 447,488, filed October 1, 1892, and on removal from the mold is placed upon the plug 17, the blocks or jaws being previously opened as shown in Fig. 1 by sliding the tube 1 down along the pipe and compressing the spring 3. In order to effect this opening of the jaws and to permit access to the blow-pipe the latter is made sufficiently long to project beyond the tube as hereinbefore stated, so that when it is desired to open the jaws, the tool is turned with the head up, the end of the blow-pipe resting upon the floor, so that by moving the tube down along the pipe the jaws will be opened. The jaws being opened as described, the blank is placed upon the plug, and the tube released, so that it, with the head 15, will move up along the pipe actuated by the spring 3. As the tube and head rise, the blocks or jaws are drawn together by the conjoint action of the pins 13 and slots 16, around the previously formed neck portion *c* of the blank. As the jaws close around the blank, the latter is carried up between the closing jaws by the upwardly moving head and plug, so that the shoulders 18 on the jaws will engage a bead $d$ on the blank, and pull the end of the latter firmly against the shoulder 20 at the base of the plug. The combined inward and downward movement of the jaws around the plug, or the inward movement of the jaws and the upward movement of the plug between the jaws, is clearly illustrated in Fig. 3, where the converging and longitudinal lines of movements of the jaws is indicated by the lines $a, b$. The exterior face of the plug 17 is made to conform as to size and shape to the opening formed in the neck of the blank, and the operative faces of the blocks or jaws similarly conform to the exterior surface of the neck of the blank as shaped in the pressing, so that the conjoint clamping action of the plug and jaws will not produce any change in the neck of the blank, unless to correct some defect therein. After the blank has been clamped in the tool, it is heated, if necessary, to render it plastic, and then the body portion expanded by blowing to the desired shape and size in the manner well known in the art. If desired, the body portion of the blank may be expanded in a mold as shown in Fig. 7.

In blowing an electric lamp bulb or other article within a mold, the mold may be placed on a rotating disk, or the mold may be stationary, while the article is rotated in the mold by the combined snap and blow-pipe.

While the blow-pipe is shown as of such a length as to pass entirely through the hollow plug, it will be evident that to those skilled in the art, the plug may form a part of the blow-pipe, the latter being connected to the tube in any suitable manner.

I claim herein as my invention—

1. In a glass making tool, the combination of a blow-pipe, jaws carried by the blow-pipe and movable toward and from each other, and a hollow plug connected to the blow-pipe and movable between the jaws in a direction at right angles or approximately so to the line of movement of the jaws, substantially as set forth.

2. In a glass making tool, the combination of jaws movable toward and from each other, a hollow plug provided with a shoulder and movable between the jaws in a direction at right angles or approximately so, to the line of movement of the jaws, and a blow pipe connected to the plug, substantially as set forth.

3. In a glass making tool, the combination of jaws movable toward and from each other, a movable tube provided with a hollow plug at its upper end so arranged that its line of movement between the jaws is in a direction at right angles or approximately so to the line of movement of the jaws, and a blow pipe extending through the tube and connected to the plug, substantially as set forth.

4. In a glass making tool, the combination of a tube provided with a hollow plug, a blow-pipe movable through the tube and connected to the plug, a cross-head movable along the tube and connected to the blow pipe arms pivoted to the cross-head and provided with inclined slots, pins attached to the tube and engaging the slots in the arms, and clamping jaws attached to the arms, substantially as set forth.

In testimony whereof I have hereunto set my hand.

THOMAS B. ATTERBURY.

Witnesses:
R. H. WHITTLESEY,
DARWIN S. WOLCOTT.